United States Patent
Boyapalle et al.

(10) Patent No.: US 12,543,044 B2
(45) Date of Patent: Feb. 3, 2026

(54) SYSTEMS AND METHODS OF AUTOMATIC OUT-OF-BAND (OOB) RESTRICTED CELLULAR CONNECTIVITY FOR SET UP PROVISIONING OF MANAGED CLIENT INFORMATION HANDLING SYSTEMS

(71) Applicant: Dell Products, LP, Round Rock, TX (US)

(72) Inventors: Anantha K. Boyapalle, Cedar Park, TX (US); Chooi Peng Low, Plano, TX (US); Liam B. Quinn, Austin, TX (US); Vivekanandh Narayanasamy Rajagopalan, Bangalore (IN)

(73) Assignee: DELL PRODUCTS LP, Round Rock, TX (US)

( * ) Notice: Subject to any disclaimer, the term of this patent is extended or adjusted under 35 U.S.C. 154(b) by 232 days.

(21) Appl. No.: 17/975,153

(22) Filed: Oct. 27, 2022

(65) Prior Publication Data
US 2024/0147240 A1    May 2, 2024

(51) Int. Cl.
H04W 12/30    (2021.01)
H04W 12/06    (2021.01)

(52) U.S. Cl.
CPC ......... H04W 12/35 (2021.01); H04W 12/068 (2021.01)

(58) Field of Classification Search
CPC .... H04W 12/35; H04W 12/068; H04W 12/06
See application file for complete search history.

(56) References Cited

U.S. PATENT DOCUMENTS

| | | | |
|---|---|---|---|
| 9,419,970 B2 | 8/2016 | Haggerty | |
| 9,532,219 B2 | 12/2016 | Schell | |
| 11,115,810 B1* | 9/2021 | Indurkar | ............... H04W 12/72 |
| 2005/0079863 A1 | 4/2005 | Macaluso | |
| 2012/0108206 A1 | 5/2012 | Haggerty | |
| 2015/0099560 A1 | 4/2015 | Schell | |

(Continued)

FOREIGN PATENT DOCUMENTS

| | | | | |
|---|---|---|---|---|
| CN | 106682494 A | * | 5/2017 | ............. G06F 21/54 |
| CN | 111148088 A | * | 5/2020 | ............. H04L 67/02 |

(Continued)

*Primary Examiner* — Shahriar Zarrineh
(74) *Attorney, Agent, or Firm* — Prol Intellectual Property Law, PLLC; H. Kenneth Prol

(57) ABSTRACT

A method of onboarding provisioning of a managed client information handling system, comprising a hardware processor executing code instructions of an endpoint onboarding agent to detecting a powering up process and automatically establish a first restricted bootstrap wireless wide-area network (WWAN) wireless link using a stored temporary provisional bootstrap embedded subscriber identity module (eSIM), identifying the managed client information handling system via the first restricted bootstrap WWAN wireless link to a remote information technology (IT) management server to trigger a second regular access WWAN wireless link for the managed client information handling system, provisioning a regular access eSIM profile to access the second regular access WWAN wireless link, and upon verified login credentials at an enterprise identity provider, downloading designated software applications for onboarding installation on the managed client information handling system.

20 Claims, 4 Drawing Sheets

(56) References Cited

U.S. PATENT DOCUMENTS

| | | | |
|---|---|---|---|
| 2015/0188946 A1* | 7/2015 | Zaitsev | H04L 63/14 |
| | | | 726/1 |
| 2015/0373541 A1 | 12/2015 | Midkiff | |
| 2016/0246611 A1* | 8/2016 | Li | H04W 8/183 |
| 2017/0155507 A1* | 6/2017 | Park | H04W 8/18 |
| 2018/0020342 A1* | 1/2018 | Park | H04W 8/183 |
| 2019/0028883 A1* | 1/2019 | Namiranian | H04W 8/183 |
| 2019/0037401 A1* | 1/2019 | Egner | H04W 12/61 |
| 2019/0073896 A1* | 3/2019 | Pinckney-Maas | |
| | | | H04M 1/72457 |
| 2019/0166483 A1* | 5/2019 | Li | H04W 4/60 |
| 2019/0332761 A1* | 10/2019 | Ducrot | G06F 21/44 |
| 2020/0037153 A1* | 1/2020 | Anand | H04W 12/35 |
| 2020/0128392 A1* | 4/2020 | Li | H04W 8/245 |
| 2020/0178070 A1* | 6/2020 | Yang | H04W 8/245 |
| 2020/0228969 A1* | 7/2020 | Shin | H04W 12/06 |
| 2020/0314635 A1* | 10/2020 | Park | H04W 12/35 |
| 2020/0358822 A1* | 11/2020 | Erickson | H04L 63/123 |
| 2020/0404501 A1* | 12/2020 | Kang | H04W 8/183 |
| 2021/0044960 A1* | 2/2021 | Bouskila | H04W 76/10 |
| 2021/0191736 A1* | 6/2021 | Starsinic | G06F 21/445 |
| 2021/0195402 A1* | 6/2021 | Soryal | H04W 12/35 |
| 2021/0314901 A1* | 10/2021 | Issakov | G01S 5/0221 |
| 2022/0046408 A1* | 2/2022 | Kang | H04W 8/183 |
| 2022/0116763 A1* | 4/2022 | Bouskila | H04W 8/183 |
| 2022/0225083 A1* | 7/2022 | Borisoglebski | H04W 4/60 |
| 2023/0108644 A1* | 4/2023 | Sikes | H04M 15/755 |
| | | | 455/419 |
| 2023/0126575 A1* | 4/2023 | Adair | H04W 12/06 |
| | | | 455/411 |
| 2023/0189001 A1* | 6/2023 | Dees | H04W 8/205 |
| | | | 455/411 |

FOREIGN PATENT DOCUMENTS

| | | | | | |
|---|---|---|---|---|---|
| CN | 108364171 B | * | 9/2020 | | G06Q 20/065 |
| GB | 2589095 A | * | 5/2021 | | H04L 67/306 |
| WO | WO-2024072387 A1 | * | 4/2024 | | H04W 12/35 |

* cited by examiner

SYSTEMS AND METHODS OF AUTOMATIC OUT-OF-BAND (OOB) RESTRICTED CELLULAR CONNECTIVITY FOR SET UP PROVISIONING OF MANAGED CLIENT INFORMATION HANDLING SYSTEMS

FIELD OF THE DISCLOSURE

The present disclosure generally relates to embedded subscriber identification module (eSIM) provisioning and onboarding provisioning. The present disclosure more specifically relates to a pre-provisioned bootstrap out-of-band communication on a cellular wireless wide area (WWAN) network to enable a managed information handling system to be onboarded and provisioned with selected, regular access cellular WWAN network.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include an antenna system that allows the information handling system to be operatively coupled to a wireless communication network.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
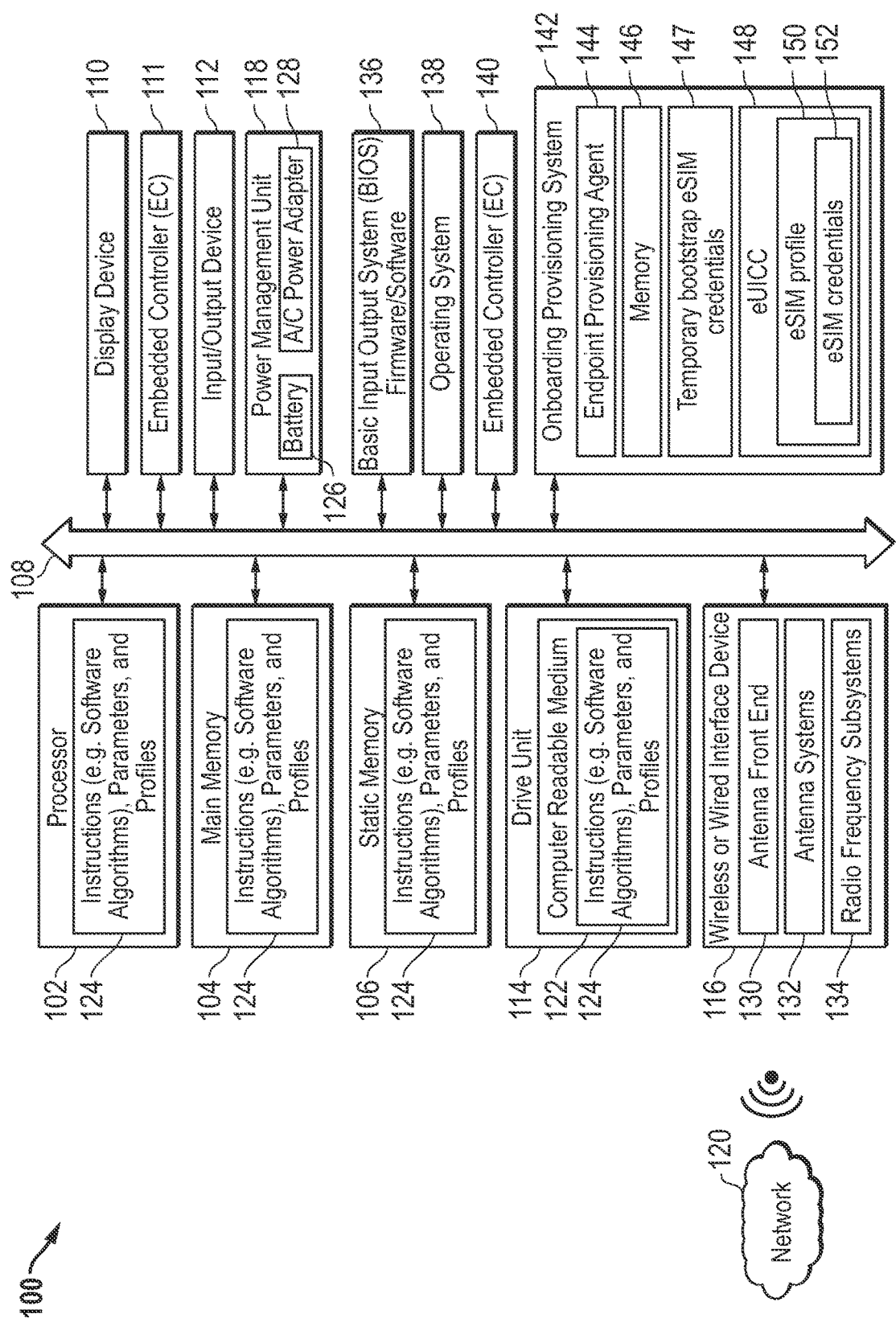
FIG. 1 is a block diagram illustrating an information handling system executing code instructions of an onboarding provisioning system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Embodiments of the present disclosure provide for a system and method of automatically provisioning a managed client information handling system with an eSIM profile and credentials that allow, for example, a wireless interface device to be operatively connected to a WWAN using an antenna within the information handling system to further conduct onboarding provisioning of the managed client information handling system. The managed client information handling system may be managed by an enterprise or with a client management service in some embodiments. For example, an enterprise may provide for management of a fleet of managed client information handling systems distributed to employees or deployed to operate any number of business or technical activities. Enterprises may periodically need to refresh, replace, swap, or purchase new systems for the fleet of managed client information handling systems. In many cases, several of the managed client information handling systems may need wireless access including via cellular wireless wide area network (WWAN) access such as to 4G, 5G or other cellular wireless protocols. When rolling out one or more new, managed client information handling systems or refreshing, swapping, or otherwise making changes among a fleet of managed client information handling systems, provisioning of an embedded subscriber identity module (eSIM) for WWAN access may require several steps before reaching final access. Further, additional steps are then required after eSIM provisioning to conduct provisioning of software installation, firmware or implementing operational configurations, settings and policies to onboard the managed client information handling systems. These various onboarding configuration settings may be implemented to enable the mission or purpose of the managed client information handling systems. Such a process to onboard managed client information handling systems may be burdensome and time consuming. A frictionless or seamless access upon deployment of each managed client information handling system is needed to reduce cost and time by reducing steps required of an enterprise user receiving such as system.

The method, in an embodiment, may include a pre-loaded temporary bootstrap embedded subscriber identification module (eSIM) profile at the managed client information handling system. This temporary bootstrap eSIM profile may be used for a temporary out-of-band (OOB) WWAN access to yield a temporary bootstrapped WWAN link by a managed client information handling system to a remote information technology (IT) management server or other IT management information handling system of an enterprise in embodiments herein. The temporary bootstrapped eSIM profile may have credentials for access at a subscription manager-discovery server (SM-DS) for a designated temporary bootstrap WWAN carrier. The designated temporary bootstrap WWAN carrier is previously approved by the enterprise to conduct the temporary and restricted bootstrap WWAN OOB wireless link. This designated temporary bootstrap WWAN carrier then provides secure and restricted temporary bootstrapped WWAN access.

The temporary bootstrapped WWAN access is restricted and temporary for bootstrapped OOB access. The temporary and restricted WWAN GOB link is used by the managed client information handling system to automatically notify, upon start-up, that the managed client information handling system has been delivered and is ready to be provisioned and onboarded in an embodiment. The temporary bootstrapped WWAN access is limited in scope and duration and may be terminated upon successful transfer of onboarding provisioning initialization data from the managed client information handling system to the remote IT management server in embodiments herein. The remote IT management server may execute code instructions on a hardware processing resource for an onboarding administrator system to administrate the onboarding provisioning process for one or more managed client information handling systems. The limited scope and duration or the temporary bootstrapped WWAN access may include exchange and acknowledgement of onboarding initialization data after the temporary bootstrap eSIM profile access credentials establish a temporary bootstrap WWAN link. Onboarding initialization data may be transmitted to the onboarding administrator system including a request or indication of auto-initiation of onboarding provisioning, managed client information handling system identifier data, and managed client information handling system location data. The temporary bootstrap WWAN link may be restricted to communicate with the remote IT management server. Once the onboarding provisioning initialization is transmitted and acknowledged, the temporary bootstrap WWAN link disabled such that the temporary bootstrapped WWAN access has limited scope and duration.

At any time after the onboarding initialization data is communicated by the managed client information handling system, the temporary bootstrapped WWAN access may be terminated by an endpoint onboarding agent executing on the managed client information handling system or by the remote IT management server. Further, the onboarding agent may disable the temporary bootstrap eSIM profile in an embodiment. The remote IT management server may also provide a command to the SM-DS at the temporary out-of-band (OOB) bootstrapped provisioning WWAN service provider to cease accepting the specific temporary bootstrap eSIM profile going forward.

Receipt of the onboarding initialization data via the restricted and temporary bootstrapped WWAN access by the remote IT management information handling system triggers an access by the remote IT management information handling system to a WWAN carrier. This access triggers and initiates provisioning of a second regular access WWAN eSIM profile on a second, regular access wireless link from the WWAN carrier to the managed client information handling system. The regular access WWAN eSIM profile is transmitted to the managed client information handling system at a network interface device and may be stored by an embedded controller (EC) in memory of an embedded universal integrated circuit card (eUICC) that is prepared to maintain the regular access eSIM profile. Then the regular access WWAN carrier may enabled use of the second, regular access eSIM profile at the managed client information handling system in embodiments herein. With this second, regular access wireless link, the managed client information handling system may then request further onboarding instructions or steps from the remote IT management server in some embodiments. In an embodiment, the remote IT management server may determine based on the location information for the managed client information handling system an optimal or best service provider for wireless link quality of service options to provide a regular access WWAN wireless link to the physical location of the managed client information handling system.

Upon receipt of a request or an indication of successful provisioning or enabling of a regular access eSIM profile at the managed client information handling system, the remote IT management server may transmit onboarding configuration settings to the managed client information handling system. These onboarding configuration settings may include address for an enterprise identity provider which may include a uniform resource locator (URL) or other address for a security log-in for access to enterprise network resources. Such an enterprise identity provider may be a remote service, or a remote server used by the enterprise to authenticate the identity of a user of the managed client information handling systems it has deployed. The onboarding configuration settings may also include identification of one or more designated software applications for later installation to satisfy the purpose of the deployed managed client information handling system in some embodiments. The onboarding configuration settings may also include one or more operational configuration settings for the managed client information handling system, required firmware or drivers needed at the managed client information handling system to perform the functions that the managed client information handling system is deployed for. Operational configuration setting may include one or more IT management setting that may include security settings, data access settings or limitations, operational requirements or limitations such as purposes for which the managed client information handling system hardware resources are dedicated or the like in various embodiments. In an embodiment, the onboarding configuration settings may be established by an IT administrator in an onboarding provisioning profile at the onboarding administrator system for managing the deployment of managed client information handling systems for the enterprise. The onboarding configuration settings for each managed client information handling system to be deployed may be associated at the remote IT management server with the identification data for that managed client information handling system in the onboarding administrator system so that upon start up and temporary bootstrapped WWAN access, the cellular communication provisioning and onboarding process may seamlessly begin.

With verified authentication, such as log in credentials, supplied by the user of the managed client information handling system to the enterprise identity provider remote server, the authentication of the user is verified with the remote IT management server system in an embodiment. At this point, the onboarding administrator system executing at the remote IT management server system may proceed to download the designated software applications, any firmware or drivers, and operational configuration settings and any other onboarding configuration settings to onboard the managed client information handling system via the second, regular access WWAN wireless link according to embodiments herein. Further, the user and the managed client information handling system may access enterprise databases and remote resources via the second, regular access WWAN and be monitored for telemetry and other operations via the same. Installation and boot up of the managed client information handling system may be conducted by a hardware processor, such as the EC or another hardware processing resource to install the designated software applications and any firmware or drivers in an embodiment. Then the managed client information handling system may operate with an ongoing regular access WWAN wireless link with the enterprise network according to operational configuration settings provisioned for that managed client information handling system.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality. In example embodiments herein, information handling system 100 may represent any of one or more managed client information handling systems according to embodiments herein. Further, some or all of information handling system 100 may represent a remote IT management server or servers or an enterprise identity server in other various embodiments herein.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute with one or more hardware processing resources a set, or multiple sets, of instructions to perform one or more computer functions.

The information handling system can include memory (volatile (e.g., random-access memory, etc.), nonvolatile (read-only memory, flash memory etc.) or any combination thereof), one or more hardware processing resources, such as a central processing unit (CPU), a graphics processing unit (GPU), an embedded controller (EC), hardware control logic, a hardware controller or any combination thereof. Additional components of the information handling system 100 can include one or more storage devices, one or more communications ports for communicating with external devices, as well as, various input and output (I/O) devices, such as a keyboard, a mouse, a video/graphic display, or any combination thereof. The information handling system 100 can also include one or more buses operable to transmit communications between the various hardware components. Portions of an information handling system 100 may themselves be considered information handling systems 100.

Information handling system 100 can include devices or modules that embody one or more of the hardware devices or hardware processing resources to execute instructions for the one or more systems and modules described herein, and operates to perform one or more of the methods described herein. The information handling system 100 may execute code instructions 124 that may operate on servers or hardware systems, remote data centers, or on-box in individual client information handling systems according to various embodiments herein. In some embodiments, it is understood any or all portions of code instructions 124 may operate on hardware processing resources at a plurality of information handling systems 100.

The information handling system 100 may include a hardware processor 102 such as a central processing unit (CPU), hardware control logic, hardware controller or some combination of the same. The information handling system 100 may include an EC 140 in some embodiments. Any of the hardware processing resources may operate to execute code that is either firmware or software code. Moreover, the information handling system 100 can include memory such as main memory 104, static memory 106, or memory 146 with computer readable medium 122 storing instructions 124 of the onboarding provisioning system 142, an endpoint onboarding agent 144, temporary bootstrap eSIM credentials 147 for temporary and restricted WWAN access, and a regular eSIM profile 150 and credentials 152 provisioned for regular WWAN in embodiments herein. In some embodiments, upon manufacture or shortly afterwards but before delivery to a user, the computer readable medium 122 storing instructions 124 of the onboarding provisioning system 142, an endpoint onboarding agent 144, temporary bootstrap embedded subscriber identity module (eSIM) credentials 147 may be preloaded on the information handling system for temporary and restricted WWAN access. The memory or memory storage with computer readable medium 122 may further include drive unit 114 or static memory 106 (volatile (e.g., random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

The information handling system 100 may further include a video display 110. The video display 110 in an embodiment may function as a liquid crystal display (LCD), an organic light emitting diode (OLED), a flat panel display, or a solid-state display. Additionally, the information handling system 100 may include an input/output device 112, such as a cursor control device (e.g., mouse, touchpad, or gesture or touch screen input, and a keyboard. The information handling system 100 can also include a disk drive unit 114.

The network interface device, shown as wired or wireless interface device 116 can provide connectivity to a network 128, e.g., a wide area network (WAN), a local area network (LAN), wireless local area network (WLAN), a wireless personal area network (WPAN), a wireless wide area network (WWAN), or other networks. Connectivity may be via wired or wireless connection. Wireless interface device 116 may include one or more radio frequency subsystems 134 with transmitter/receiver circuitry, modem circuitry, one or more radio frequency front end circuits, one or more wireless controller circuits, amplifiers, antenna systems 132 and other radio frequency subsystem circuitry 134 for wireless communications via multiple radio access technologies. These radio access technologies may include Wi-Fi communications, Bluetooth, or near-field communication (NFC) technologies. The wireless interface device 116 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless interface device 116, also referred to as a network interface device may operate according to two or more WWAN wireless links. In an embodiment, temporary bootstrap WWAN wireless data communications, for example, may be received and transmitted via the antenna system 132 and antenna front end 130 as described in the present disclosure.

The network interface device 116 may operate in accordance with any cellular wireless data communication standards. In embodiments herein, the wireless network interface device 116 may operate with one or more WWAN carriers. For example, the wireless network interface device 116 may operate with an approved bootstrap WWAN carrier for the temporary bootstrap eSIM profile credentials 147 used to establish the temporary and restricted onboarding WWAN access to the remote IT management information handling system to initiate onboarding provisioning in an embodiment. Further, the wireless network interface device 116 may operate with one or more WWAN carriers including one or more regular access WWAN carriers operating in the physical location of the managed client information handling system for provisioning of a second regular access WWAN eSIM profile on a second, regular access wireless link from the WWAN carrier to the managed client information handling system. The regular access WWAN eSIM profile is transmitted to the managed client information handling system via its network interface device 116 and may be stored in memory 146 of an embedded universal integrated circuit card (eUICC) 148. In this way, provisioning the second, regular access WWAN eSIM profile maintains and enables use of the second, regular access eSIM profile at the managed client information handling system in embodiments herein to complete onboarding and provide ongoing wireless access.

Wireless network interface device 116, in an embodiment, may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WWAN standards, which may operate in both licensed and unlicensed spectrums. More specifically, the network interface device 116 in an embodiment may transceive within radio frequencies associated with the 5G New Radio (NR) Frequency Range 1 (FR1) or Frequency Range 2 (FR2), or those associated with 4G LTE and other standards predating the 5G communications standards now emerging. NRFR1 may include radio frequencies below 6 GHz. NRFR2 may include radio frequencies above 6 GHz, made available within the now emerging 5G communications standard. Communications within the WLAN or WWAN may be enabled through the use of either an evolved Node B (eNodeB) executing an evolved packet core of an existing LTE system, or a Next Generation Node B (gNodeB) executing the next generation packet core of the 5G cellular standard. The wireless interface device 116 may also include radio frequency subsystems 134 circuitry used to connect to any combination of macro-cellular wireless connections including 2G, 2.5G, 3G, 4G, 5G or the like from one or more service providers such as a WWAN service provider for access to wireless network 120.

Utilization of radiofrequency communication bands according to some example embodiments of the present disclosure may include bands used with the WLAN standards and WWAN carriers, which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band for WLAN. WLAN, in another example, may also operate at a 2.4 GHz band. WWAN may operate in a number of bands, some of which are proprietary but may include a wireless communication frequency band at approximately 2.5 GHz or 5 GHz bands for example. In additional examples, WWAN carrier licensed bands may operate at frequency bands of approximately 700 MHz, 800 MHz, 1900 MHz, or 1700/2100 MHz as well as the NRFR1, NFRF2, bands, and other known bands.

In some embodiments, software, firmware, dedicated hardware implementations such as application specific integrated circuits, programmable logic arrays and other hardware devices can be constructed to implement by executing code instructions of one or more of some systems and methods described herein. Applications that may include the apparatus and systems of various embodiments can broadly include a variety of electronic and computer systems with hardware processing resources executing code instructions in software or firmware. One or more embodiments described herein may implement functions using two or more specific interconnected hardware modules or hardware processing devices with related control and data signals that can be communicated between and through the modules, or as portions of an application-specific integrated circuit. Accordingly, the present system encompasses hardware processing resources executing software or firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 120 can communicate voice, video or data over the network 120. Further, the code instructions 124 may be transmitted or received over the network 120 via the network interface device or wireless interface device 116.

The information handling system 100 can include a set of code instructions 124 that when executed by hardware processing resources can be executed to cause the computer system to perform any one or more of the methods or computer-based functions disclosed herein. For example, instructions 124 may execute instructions 124 of the onboarding provisioning system 142, an endpoint onboarding agent 144, temporary bootstrap eSIM credentials 147 for temporary and restricted WWAN access, and a regular eSIM profile 150 and credentials 152 provisioned for regular access WWAN carrier in embodiments herein, software agents, or other software applications, firmware, or aspects. Various software modules comprising application code instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 114, static memory 106, or memory 146 includes a computer-readable medium 122 in which one or more sets of code instructions 124 such as software or firmware can be embedded. Similarly, main memory 104 and static memory 106 may also contain a computer-readable medium for storage of one or more sets of instructions, parameters, or profiles 124 including an estimated training duration table. The disk drive unit 114, static memory 106, or memory 146 may also contain space for data storage. Further, the code instructions 124 may embody one or more of the methods or software systems as described herein. For example, instructions relating to the instructions 124 of the onboarding provisioning system 142, an endpoint onboarding agent 144, temporary bootstrap eSIM credentials 147 for temporary and restricted WWAN access, and a regular eSIM profile 150 and credentials 152 provisioned for regular WWAN, other software algorithms, processes, and/or methods may be stored here. In a particular embodiment, the instructions, parameters, and profiles 124 may reside completely, or at least partially, within the main memory 104, the static memory 106, memory 146, and/or within the disk drive 114 during execution by the processor 102 or EC 140 of information handling system 100. As explained, some or all of the instructions 124 of the onboarding provisioning system 142, an endpoint onboarding agent 144, temporary bootstrap eSIM credentials 147 for temporary and restricted WWAN access, and a regular eSIM profile 150 and credentials 152 provisioned for regular WWAN in embodiments herein may be executed locally on a managed client information handling system or remotely at a remote IT management server or servers, SM-DS servers of a carrier, or enterprise identity servers. Further, a remote IT management server information handling system may execute code instructions of an onboarding administrator system executable by hardware processing resources thereon according to various embodiments herein.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The instructions 124 of the onboarding provisioning system 142, an endpoint onboarding agent 144, temporary bootstrap eSIM credentials 147, and a regular access eSIM profile 150 and credentials 152 may be stored in memory 146, static memory 106, or the drive unit 114 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may include code instructions 124 of the onboarding provisioning system 142, an endpoint onboarding agent 144, temporary bootstrap eSIM credentials 147 for temporary and restricted WWAN OOB access, and a regular eSIM profile 150 and credentials 152 provisioned for regular WWAN access in embodiments herein that may be operably connected to the bus 108. The onboarding provisioning system 142 may have computer-readable medium 122 that may also contain space for data storage or access to the data storage. For example, portions of the onboarding provisioning system 142 may, according to the present description, include an endpoint onboarding agent 144 and temporary, provisional bootstrap eSIM profile credentials 147, pre-provisioned at or before shipment, for temporary and restricted WWAN access, to perform tasks related to initiating an out-of-band (OOB) communication to establish the OOB communication with a remote IT management server. In embodiments herein, this is done through a subscription manager-discovery server (SM-DS) at an approved bootstrap WWAN carrier using the temporary provisional bootstrap eSIM profile 147. The onboarding provisioning system 142 may also include a memory 146 to maintain, for example, a later provisioned or enabled regular access eSIM profile 150 from a selected regular access WWAN carrier, which may be the same or different from the approved bootstrap WWAN carrier to allow the managed client information handling system 100 to gain regular WWAN wireless link access upon authentication and continue the onboarding provisioning process automatically from the remote IT management server system of an enterprise executing the onboarding administrator system.

The onboarding provisioning system 142 may also include an embedded universal integrated circuit card (eUICC) 148. The eUICC 148 may, in an embodiment, maintain the regular access eSIM profile 150 with its eSIM credentials 152 at memory 146 when provisioned and enabled from a selected regular access carrier in order to operatively couple the managed client information handling system 100 to a wireless carrier such as a WWAN carrier network. This regular access eSIM profile 150 may be provided with onboarding configuration instructions after the initiation of onboarding provisioning via the temporary bootstrap eSIM credentials 147 with the temporary and restricted WWAN access according to embodiments herein. In an embodiment described herein, the eUICC 148 may be left blank by a manufacturer during a build-to-ship (BTS) process for later provisioning and downloading of the regular access eSIM profile 150 and eSIM credentials 152. In other embodiments, the eUICC 148 may have a separate memory or the same memory may be preloaded with temporary embedded subscriber identity module (eSIM) credentials 147 at BTS for temporary and restricted WWAN OOB access to the IT management server to initiate onboarding provisioning.

During this BTS process, a user or enterprise may order the managed client information handling system 100 that includes various features and hardware to fit the user's needs. An IT manager may determine one or more designated software applications, operational configuration settings, and other onboarding configurations for the client information handling system. These onboarding configurations then may be associated with the pre-loaded temporary bootstrap eSIM credentials 147 and identifier data for the managed client information handling system 100 during the BTS process or during refurbishment before shipment to an enterprise user. One of these features is the selection of a pre-approved temporary bootstrap WWAN carrier to allow a user to, via the wireless interface device 116, access a temporary and restricted wireless connection to a WWAN network 120 to initiate onboarding provisioning by the remote IT management server system. In these embodiments, the eUICC 148 is may delete or disable the temporary bootstrap eSIM credentials 147 after the restricted and temporary WWAN access with the temporary bootstrap WWAN carrier for initiation of the automatic onboarding provisioning. The preapproved temporary bootstrap WWAN carrier may receive indication that the temporary bootstrap eSIM credentials 147 are to be accepted at the SM-DS and that the enterprise user has subscribed to that temporary bootstrap WWAN carrier's services for a restricted and temporary WWAN link to the remote IT management server that is limited for communication to initiate the onboarding provisioning and disabled thereafter.

In an embodiment, the onboarding provisioning system 142 and one or more of its parts may communicate with the main memory 104, the EC 140, the processor 102, the video display 110, the alpha-numeric input/output device 112, and the wireless interface device 116 via bus 108, and several forms of communication may be used, including ACPI, SMBus, a 24 MHZ BFSK-coded transmission channel, or shared memory. Driver software, firmware, controllers and the like may communicate with applications on the information handling system 100.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware processing resources executing software or firmware, and hardware implementations.

When referred to as a "system", a "device," a "module," a "controller," or the like, the embodiments described herein can be configured as hardware or hardware processing resources executing software or firmware code instructions. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a hardware system (such as a motherboard, a system-on-a-chip (SoC), or a stand-alone device). The hardware system, hardware device, hardware controller, or hardware module can include hardware processing resources executing software or firmware embedded at a device, such as an Intel® Core class processor, ARM® brand processors, Qualcomm® Snapdragon processors, an embedded controller (EC) or other processors and chipsets, or other such device, or software capable of operating a relevant environment of the information handling system. The hardware system, hardware device, hardware controller, or hardware module can also include a combination of the foregoing examples of hardware or hardware executing code instructions of software. In an embodiment an information handling system 100 may include an integrated circuit or a board-level product having portions thereof that can also be any combination of hardware and hardware executing code instructions of software. Hardware processing devices, modules, resources, or hardware controllers that are in communication with one another need not be in continuous communication with each other, unless expressly specified otherwise. In addition, hardware processing devices, modules, resources, or hardware controllers, that are in communication with one another can communicate directly or indirectly through one or more intermediaries.

During operation, the user may turn on the information handling system 100 for the first time after delivery of the information handling system 100 from the manufacturer or refurbisher. As described herein, the IT manager or other enterprise representative had engaged the BTS operation where the code instructions 124 of the onboarding provisioning system 142, an endpoint onboarding agent 144, and temporary bootstrap eSIM credentials 147 for temporary and restricted WWAN OOB access, are preloaded and associated with identifier information for the managed client information handling system 100 in embodiments herein.

As described, the IT manager may enter the onboarding configuration profile desired to accommodate the tasks designated for the managed client information handling system 100 with various options set as onboarding configuration settings at an onboarding administrator system at an IT management server system. These options may record the types of processors to be operatively coupled within the managed client information handling system 100, the size and type of memory to install, other hardware selections, and the type of operating system to include. Further, the IT manager may select other types of designated software and firmware to be downloaded to the managed client information handling system from the enterprise network upon delivery to onboard the managed client information handling system to perform designated tasks within the enterprise. In an embodiment, the IT manager may also select an approved temporary bootstrap WWAN wireless carrier or carriers to subscribe to in anticipation of using the WWAN network for an OOB temporary and restricted bootstrap wireless access between the IT management server system and the managed client information handling system for communications to initiate the automatic onboarding provisioning process. Further options for selection by the IT manager may include operational configurations and policy settings with respect to operations, security, data and network accesses, and other operational configuration settings for the managed client information handling system. These options may be associated with the identifier information for the managed client information handling system being built or refurbished for an enterprise user for later seamless and automatic onboarding provisioning.

The manufacturer, at this point, may include the temporary bootstrap eSIM profile credentials 147 at the eUICC 148 in at least one memory 146 according to an embodiment. Instead, once the IT manager has selected a specific temporary bootstrap WWAN carrier or carriers, the manufacturer or IT management may send the reciprocal carrier temporary bootstrap eSIM profile credentials or request for a carrier temporary bootstrap eSIM profile credential directly to a server associated with this temporary bootstrap WWAN carrier. Along with the temporary bootstrap eSIM profile credentials 147, the manufacturer may include transmitting the device identifier data for unique device identification of the managed client information handling system 100 to the onboarding administrator system at the IT management server for association with the onboarding configuration profile set by an IT manager. Because the manufacturer or IT manager has sent the temporary bootstrap eSIM profile credentials 147 to the approved bootstrap WWAN carrier, the device identification may be used later by the endpoint onboarding agent 144 to automatically initiate onboarding provisioning via the temporary and restricted bootstrap WWAN OOB link with little to no interaction from the user.

As described in embodiments herein, after the user initiates power to the managed client information handling system 100 the EC 140 or other hardware processing resources may execute the endpoint onboarding agent 144 of the onboarding provisioning system 142 to initiate onboarding provisioning at the IT management server. With the temporary and restricted WWAN link access established from the endpoint onboarding agent 144, the IT management server may trigger provisioning and enablement from a regular access WWAN carrier with a regular access eSIM profile 150 and eSIM credentials 152 to the managed client information handling system 100. With the operatively coupled regular access WWAN link, the onboarding provisioning is completed if authentication is successful. Where enterprise identity server does not provide an indication that the user has provided successful authentication, such as a login to the enterprise network, the onboarding provisioning process may end.

Upon being operatively coupled to the subscription manager-discovery server (SM-DS) for the temporary bootstrap WWAN wireless link, the EC 140 may direct that the device identification be transmitted to the temporary bootstrap WWAN carrier SM-DS for verification by the temporary bootstrap WWAN carrier SM-DS. In one embodiment, the device identification data may include an encryption of hardware and/or software codes such as serial numbers associated with these hardware components or software installed in the build of an information handling system. The serial numbers, versions, or other codes will thus be unique to the information handling system. Such device identifier information may be harvested and known by the information handling system manufacturer and the order of component serial numbers or other codes used may be unique as well adding an additional layer of security. In this embodiment, these serial numbers associated with the hardware and/or software may be encrypted and used as specific device identification being transmitted to the temporary bootstrap WWAN carrier access SM-DS and to the IT management server system for later verification and association with the new or refurbished managed client information handling system delivered to the enterprise user.

In another embodiment, the managed client information handling system 100 may determine device location information as determined from a device location sensor 111, such as a global positioning system or a network device locator or other system, may be included in an initialization of onboarding processing via the temporary and restricted WWAN OOB access to the IT management server systems to identify and locate the managed client information handling system 100. This identifier information and location information may be associated with the managed client information handling system for an onboarding configuration profile for regular access WWAN carrier selection and designated software, firmware, operational configuration settings and other aspects of the onboarding provisioning assigned to the new of refurbished managed client information handling systems. This device location information data for the managed client information handling system 100 may be used by onboarding administrator system at the remote IT management server to select an optimal regular access WWAN carrier for the physical location of the managed client information handling system 100 in some embodiments herein.

In some embodiments of the present specification, the device identification data may be referred to as a Dell® Device ID (DDID). This DDID may be used by the information handling system, the temporary bootstrap WWAN carrier SM-DS, and IT management server and as part of the onboarding provisioning system 142 trigger a regular access WWAN carrier to authorize the managed client information handling system to receive the regular access eSIM profile 150 and eSIM credentials 152 and one or more international mobile subscriber identities (IMSIs). Because the serial numbers associated with the hardware and software within the information handling system is unique to that hardware and software and because the selection and order of serial numbers is unique as well as the selected codes or serial numbers are further encrypted, the possibility of determining a DDID is very low. This increases the security associated with onboarding provisioning the regular access eSIM profile 150 and eSIM credentials 152 via the temporary and restricted WWAN OOB access as well as security of the further onboarding provisioning of the managed client information handling system 100 according to embodiments herein.

The systems and methods described herein provide for a less obtrusive process of initializing for onboarding provisioning including for a connection to a regular access WWAN carrier for a managed client information handling system 100 for a regular access eSIM profile 150 via temporary and restricted WWAN OOB communications. Because the EC 140 or a CPU 102 executes this initialization through an automatic execution of an endpoint onboarding agent 144, the system and methods described may provide an almost zero-touch, autonomous solution that provides a streamlined and user-friendly onboarding provisioning for an enterprise user and IT management as part of an out-of-box experience for the enterprise user. This may occur even, in some embodiments, without execution of the OS to receive a provisioned regular access eSIM profile for WWAN connectivity that is later available to the OS and endpoint onboarding agent to finish onboarding after authentication of the enterprise user to the enterprise network and IT management server systems. In these examples, the enterprise user may not be involved in the temporary and restricted or regular access WWAN provisioning process and may not, in some embodiments, be aware of the process being executed with the exception of entering network login credentials.

Figure 2:
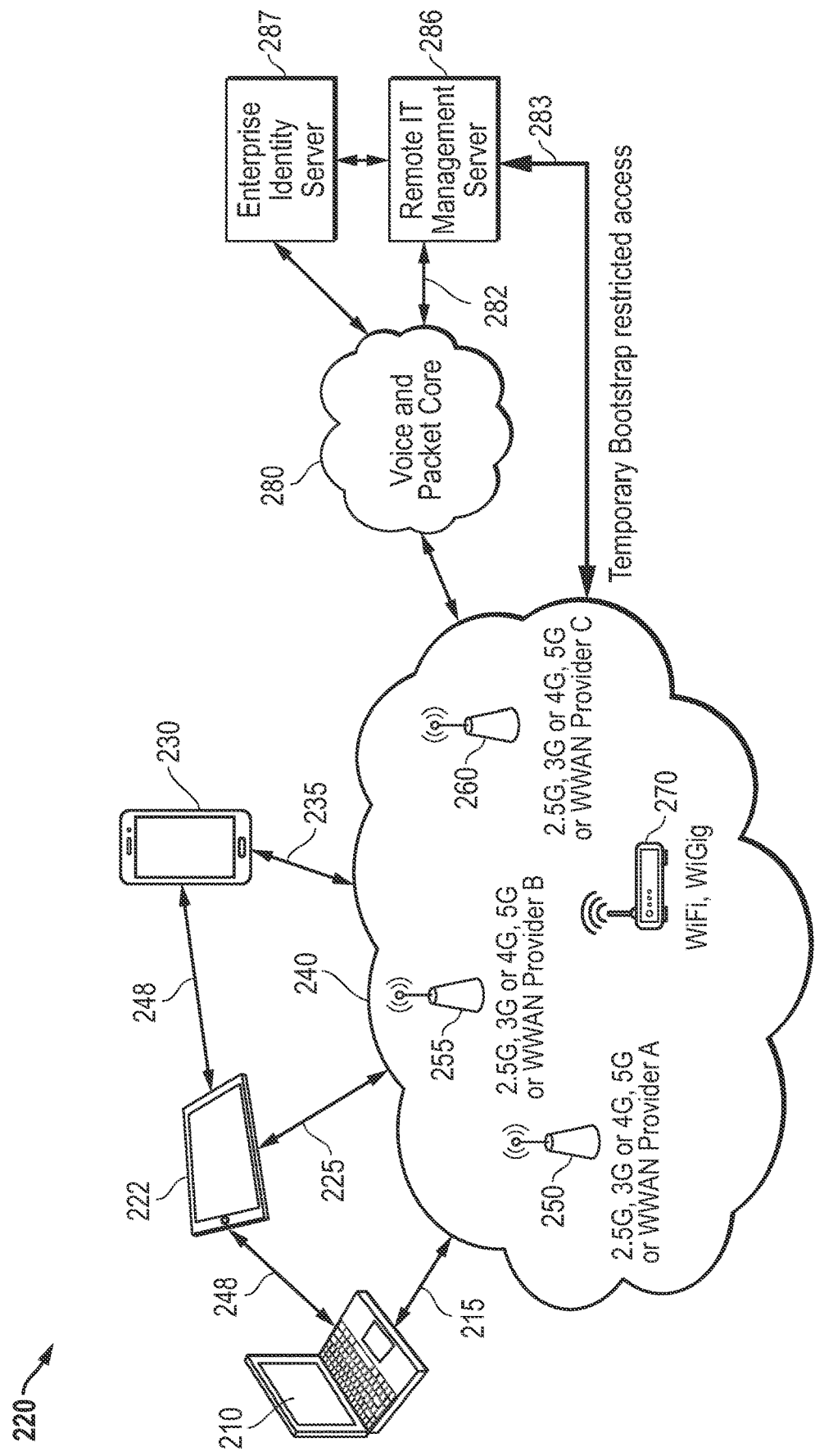
FIG. 2 is a block diagram of a network environment architecture offering plural cellular communication protocol options for a managed client information handling systems providing temporary bootstrapped restricted WWAN access according to an embodiment of the present disclosure.

FIG. 2 is a block diagram of a network environment offering several communication protocol options and mobile information handling systems according to an embodiment of the present disclosure. In a particular embodiment, network 220 includes networked information handling systems 210, 222, and 230 that may include one or more managed client information handling systems with wireless capabilities, wireless network access points, and multiple wireless connection link options according to embodiments herein. A variety of additional computing resources of network 220 may include other managed client mobile information handling systems, remote data processing servers such as a remote IT management server or servers, enterprise identity server or servers, network storage devices, local and wide area networks, or other resources as needed or desired. As specifically depicted, managed client information handling systems 210, 222, and 230 may be a laptop computer, tablet computer, 360-degree convertible systems, wearable computing devices, a smart phone device, server systems, or other computing systems. These managed client information handling systems 210, 222, and 230, may access any of a plurality of wireless networks 240. In an example embodiment, these managed client information handling systems 210, 222, or 230 utilize the systems and methods disclosed in embodiments herein for seamless onboarding provisioning. Wireless networks 240 may include WWAN wireless networks 250, 255 and 260 from different WWAN carrier providers. Other communication technologies may include wireless local networks such as 270 including Wi-Fi, WiGig, other WLAN, and small cell WWAN. For example, any of the WWAN wireless networks 250, 255, or 20 may be used as the temporary bootstrap WWAN carrier for temporary or limited bootstrap WWAN access 283 to an IT management server to initialize onboarding provisioning with the onboarding provisioning system 142 according to embodiments herein. As part of the onboarding provisioning, the IT management server 286 may trigger a regular access WWAN carrier to authorize the managed client information handling system to receive the regular access eSIM profile 150 and eSIM credentials 152 from the same WWAN wireless network or another WWAN wireless network among 250, 255, and 260 according to embodiments herein.

Other communication technologies are described in embodiments herein for wireless communication in some embodiments as well. In other embodiments, wireless networks may include wireless local area networks (WLANs) or small cell systems, a wireless personal area network (WPAN) as between devices such as 210, 220, and 230, or a wireless wide area network (WWAN) such as 250, 255, or 260. In one example embodiment, LTE LPWAN or other WWAN networks may operate with a wireless access point option such as an eNodeB or gNodeB base station or other base station device. In another example embodiment, LTE-LAA WWAN may operate with a small-cell WWAN wireless access point option.

Since WPAN or Wi-Fi Direct Connection and WWAN networks can functionally operate similar to WLANs, they may be considered as wireless local area networks (WLANs) for purposes herein. Components of a WLAN, an LPWAN, or other low power communication technologies may be connected by wireline or Ethernet connections to a wider external network. For example, wireless network access points may be connected to a wireless network controller and an Ethernet switch.

Wireless links within wireless networks 240 of network 220 may include macro-cellular connections via one or more service providers at the macro-cellular network 260. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like. Alternatively, other available wireless communications across any of wireless networks 240 may be via standard protocols such IEEE 802.11 Wi-Fi, IEEE 802.11ad WiGig, IEEE 802.15 WPAN, or other emerging 5G small cell WWAN communications such as eNodeB, or similar wireless network protocols. Wireless networks 240 may include a variety of licensed, unlicensed or shared communication frequency bands as well as a variety of wireless protocol technologies ranging from those operating in macrocells, small cells, picocells, or femtocells. In an embodiment of the present specification, the service providers 260 of the WWAN carriers may operate over licensed bands at frequency bands of approximately 700 MHz, 800 MHz, 1900 MHz, or 1700/2100 MHz for example as well. A network interface device of the networked information handling systems 210, 222, and 230 in an embodiment may transceive within radio frequencies associated with the 5G New Radio (NR) Frequency Range 1 (FR1) or Frequency Range 2 (FR2). NRFR1 may include radio frequencies below 6 GHz, associated with 4G LTE and other standards predating the 5G communications standards now emerging. NRFR2 may include radio frequencies above 6 GHz, made available within the now emerging 5G communications standard. Communications within NRFR1 may be enabled through the use of either an evolved Node B (eNodeB) executing an evolved packet core of an existing LTE system, or a Next Generation Node B (gNodeB) executing the next generation packet core of the 5G cellular standard.

In some embodiments according to the present disclosure, a networked information handling system 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, in the context of the present specification, the networked information handling systems 210, 222, and 230 may include any number of antennas that may operate to first operatively couple the managed client information handling system 210, 222, and 230 to a temporary bootstrap WWAN carrier SM-DS via, for example, a pre-loaded, temporary provisional bootstrap eSIM. This restricted provisional bootstrap eSIM is used to establish a temporary and restricted bootstrap WWAN wireless connection 283 via an approved temporary bootstrap WWAN carrier to the remote IT management server 286. As described herein, the narrow and restricted bootstrap WWAN wireless connection 283 is initiated as OOB communications and for the limited purpose of communicating identifier information, location information, and other onboarding provision initiation data to an IT management server 286. It is temporary in that it is disabled upon initiating the onboarding provisioning at an onboarding administrator system of the IT management server 286.

In some embodiments, the OOB communications are initiated by an EC loading a driver or drivers associated with the operation of a wireless interface device and associated antenna systems, antenna front ends, and/or radio frequency subsystems with the temporary provisional bootstrap eSIM credentials. The EC may determine that the managed client information handling system has been turned on before initializing the narrow and restricted bootstrap WWAN wireless connection 283 for OOB communications via execution of code instructions of an endpoint onboarding agent. In one embodiment, the EC may operate with the BIOS or the OS of the information handling system when executing the endpoint onboarding agent. In another embodiment, the EC may operate outside of the BIOS or OS when executing the endpoint onboarding agent for the initiation of the OOB communication with the approved bootstrap WWAN carrier SM-DS such that the narrow and restricted bootstrap WWAN wireless connection 283 is initiated. In this way, the OOB communications may be OS-independent. In either embodiment, the execution of the endpoint onboarding agent to initiate onboarding provisioning may be conducted without input from the user of the managed client information handling system. The networked information handling systems 210, 222, and 230 may further include an antenna that provides for operatively coupling the networked information handling systems 210, 222, and 230 to the WWAN service providers 250, 255, and 260 operating a using, for example, 5G communication technologies during OS operations after a regular access WWAN eSIM profile is established according to embodiments herein.

The managed client information handling systems 210, 222, and 230 may initially communicate with the approved bootstrap WWAN carrier SM-DS via an OOB communication in order to initiate onboarding provisioning with the IT management server systems 286. This triggers a second, regular access WWAN link with the managed client information handling system from the same or a different WWAN carrier 250, 255, or 260, whichever is selected by the onboarding administrator system, to provision and enable a regular access eSIM profile and credentials. The managed client information handling system may execute code instructions for the endpoint onboarding agent to transmit a unique device identification and device location to the onboarding administrator system at the IT management server system 286 for comparison and association with an onboarding configuration profile for the managed client information handling system to be onboarded. Further, upon a request for next steps by the managed client information handling system, an address location, such as a URL, for an enterprise identity server 287 is provided via the regular access wireless link. Further, a notification identifying designated software applications, firmware applications, and operational configuration settings to be established may be transmitted in a set of onboarding configuration data specified for the managed client information handling system onboarding process that may be performed after enterprise user authentication. Then the enterprise user of the managed client information handling system may access a remote enterprise identity server 287 to prove verification of identity, such as with an enterprise network login, which when verified to the IT management server 286 may allow download and installation of designated software, firmware, and operational configuration settings from the onboarding provisioning profile to the managed client information handling system. This process is described in more detail herein.

Wireless networks 240 may be connected through to a voice and packet core network 280 that may contain externally accessible computing resources and connect to a remote data centers such as the remote IT management server 286 or enterprise identity server 287 in network 220. The voice and packet core network 280 may contain multiple intermediate web servers or other locations with accessible data (not shown). The voice and packet core network 280 may also connect to other wireless networks similar to those shown within 240 and additional mobile information handling systems such as 210, 222, 230 or similar connected to those additional wireless networks. Connection 282 between the wireless networks 240 and remote data center 286 or connection to other additional wireless networks may be via Ethernet or another similar connection to the worldwide-web, a WAN, a LAN, another WLAN, or WWAN, or other network structure. Such a connection 282 may be made via a WLAN or WWAN access point/Ethernet switch to the external network and be a backhaul connection. The access point may be connected to one or more wireless access points in the WLAN or WWAN before connecting directly to a mobile information handling system such as 210, 222, 230 or may connect directly to one or more information handling systems 210, 222, and 230. Alternatively, information handling systems 210, 222, and 230 may connect to the external network via base stations according to various wireless protocols 255, 260, or 270 within wireless networks 240. The remote data centers or other remote information handling systems may provide central terminals for IT management and security assessment via operation of always-on management or security solution code instructions via cloud agents of such systems in various embodiments.

Remote data centers such as the remote IT management server systems 286 or the enterprise identity server system 287 may include web servers or resources within a cloud environment that operate via the voice and packet core 280 or other internet connectivity. For example, remote data centers can include additional information handling systems, data processing servers, network storage devices, local and wide area networks, or other resources as needed or desired. In the context of the present specification, the remote data center 286 may include a SM-DS for one or more WWAN carriers 250, 255, or 260 used by the managed client information handling systems such as 210, 222, 230 for restricted and temporary bootstrapped WWAN link 283 to initiate onboarding provisioning as well as to further access and download the provisioned regular access WWAN carrier eSIM profile for finalizing onboarding and for ongoing connectivity. A remote data center may permit fewer resources to be maintained in other parts of network 220 and may allow the managed client information handling systems such as 210, 222, 230 to operate via an OOB communication in order to download the WWAN carrier eSIM profile as described herein.

During operation, an IT manager for the managed information handling systems 210, 222, 230 may access an approved temporary bootstrap carrier SM-DS over the plurality of wireless networks 240 in order to provide data related to a subscription to an approved temporary bootstrap WWAN carrier as well as device identification identifying the managed client information handling systems 210, 222, 230 that may access via temporary provisional bootstrap eSIM. After the managed client information handling systems 210, 222, 230 have been built per an enterprise's specifications and assigned onboarding configuration settings, the enterprise user may initiate the managed client information handling system 210, 222, 230 by actuating a power-on button to initiate the onboarding provisioning of the present embodiments. In the present specification, an EC or other hardware processor of the information handling system 210, 222, 230 executing an endpoint onboarding agent may initiate an OOB communication with the approved temporary bootstrap WWAN carrier SM-DS in order to first verify the identification of the information handling system 210, 222, 230 and then initiate a download of a regular access WWAN carrier eSIM profile to for which a subscription for the user's information handling system 210, 222, 230 has been assigned and selected. This assignment and selection may be based on selection of an optimal quality of service indicator based on location data received from the managed client information handling system. The WWAN carrier eSIM profile may include any eSIM that, once downloaded, allows the information handling system 210, 222, 230 to execute the carrier eSIM profile in order to be operatively coupled to a WWAN associated with the service provider at the macro-cellular network 260 to verify login credentials, complete onboarding processes, and then operate with WWAN access to enterprise network and data.

Figure 3:
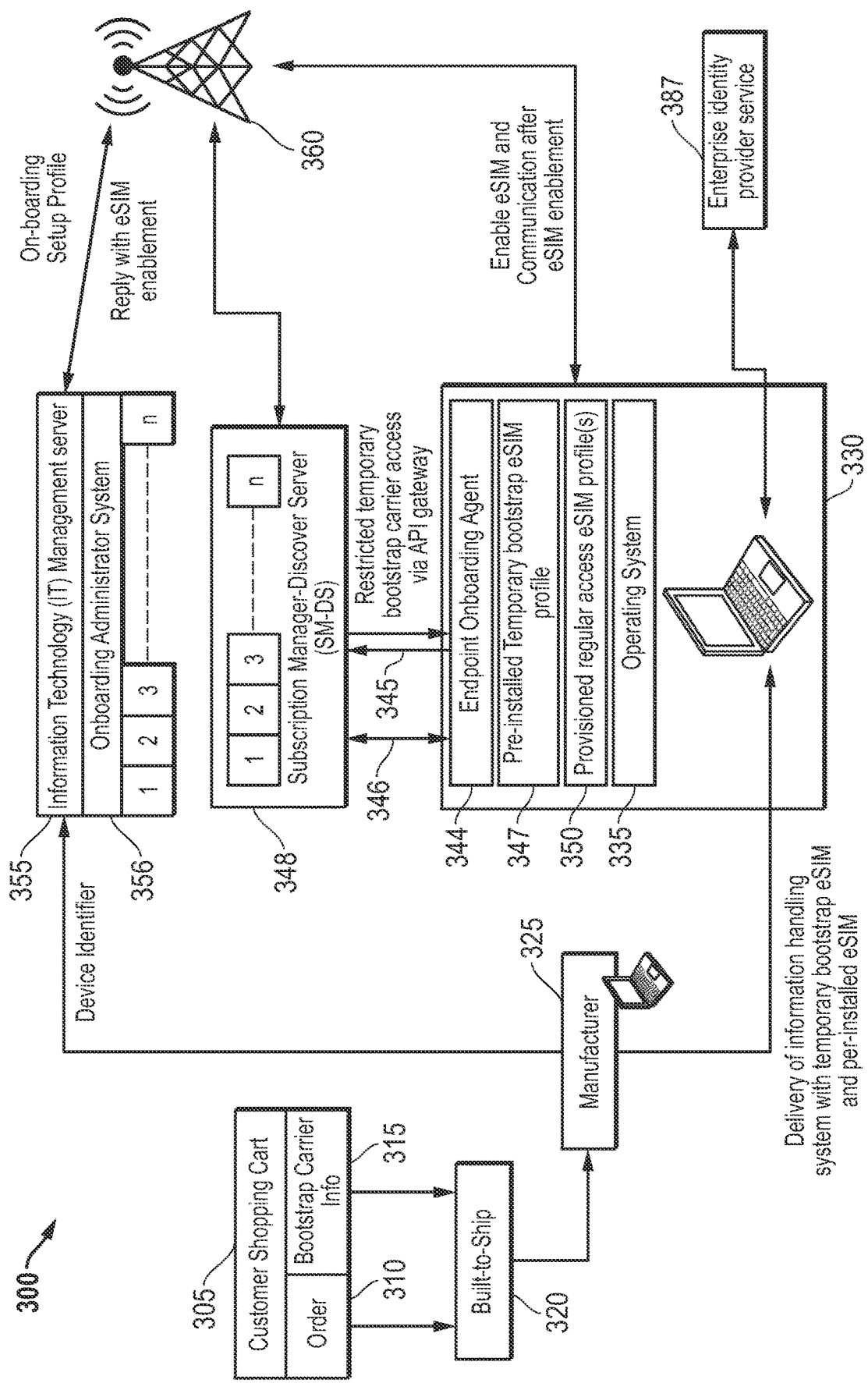
FIG. 3 is a block diagram of a system for bootstrapped out-of-band (OOB) WWAN access pre-provisioned to enable a temporary restricted bootstrap WWAN access with a temporary bootstrap embedded subscriber identification module (eSIM) profile on a managed client information handling system for initiating onboarding provisioning according to an embodiment of the present disclosure.

FIG. 3 is a block diagram of a system 300 for onboarding provisioning of a managed client information handling system 330 with a regular access eSIM profile and other onboarding configuration settings including software, firmware and operational configuration settings and policies to be installed or implemented by IT management according to an embodiment of the present disclosure. The system 300 includes a manufacturer 325 of an information handling system 330, where a customer shopping cart may receive selections from an IT manager for an order 310 for an information handling system 330 and selection of an approved temporary bootstrap WWAN carrier 360 (e.g., a WWAN service provider A, B, C, or n from FIG. 2) in bootstrap carrier information 315. The bootstrap carrier information may include details for placement and pre-loading of a temporary provisional bootstrap eSIM that may be used to automatically provide a temporary and restricted bootstrap WWAN wireless link with an IT management server 355 via a temporary bootstrap WWAN carrier SM-DS such as 348. The restricted bootstrap WWAN wireless link may provide for a limited OOB connection to initiate onboarding provisioning at the IT management server 355. In some embodiments, the IT manager may order for a refurbishment of a managed client information handling system 330 instead of a new purchase. This refurbished, managed client information handling system 330 may still need onboarding provisioning according to embodiments herein for transfer to a different enterprise user for a different role in the enterprise. The IT manager may select a managed client information handling system 330 with hardware and system configurations needed in refurbishment and assign configurations to be set or adjusted. The refurbished managed client information handling system 330 will also require a pre-loaded temporary provisional bootstrap eSIM for onboarding provisioning according to embodiments herein.

The system 300 may include a manufacturer 325 that hosts, for example, an e-commerce website used by an IT manager or other enterprise representative to build to order and ship the managed client information handling system 330. During access to the e-commerce website in an embodiment, the IT manager may place any order 310 for an information handling system 330 based on selected criteria. For example, the user may build the information handling system 330 by selecting a processor type, a memory size, input devices, a size of a display device, an operating system to be executed by the BIOS of the information handling system 330, and software to be pre-installed on the information handling system 330. Further, the temporary provisional WWAN carrier information 315 with pre-installed temporary bootstrap eSIM profile 347 may be specified by the IT manager, or even provided, any antenna systems selected to be used to later wirelessly couple the information handling system 330 to any of an SM-DS 348 for a temporary and restricted bootstrap WWAN link.

During this "build" process, the IT manager may also select a specific temporary bootstrap carrier or carriers 360 to which the user has agreed to pay any subscription fees in order to access the networks (e.g., WWAN) maintained by the carriers 360 for the temporary restricted bootstrap wireless link to the IT management server 355. This selection may be part of the bootstrap carrier information 315. After providing the order aspects and identification of the temporary bootstrap WWAN carrier, payment for the virtually-built information handling system 330 and the temporary bootstrap WWAN carrier's 360 subscription access may be made and the ordered information handling system 330 may be placed in the customer shopping cart 305 as part of the order 310 to be executed. Along with the order 310 for the information handling system 330 to be built and shipped, the customer shopping cart 305 may also include details related to the temporary bootstrap WWAN carrier's information 315.

With this information, the manufacturer 325 may initiate a build-to-ship 320 process. This build-to-ship 320 process includes the physical building of the managed client information handling system 330 pursuant to the order 310 placed by the enterprise. As described, the build-to-ship 320 process includes building an information handling system 330 that includes a processor type, a memory size, input devices, a size of a display device, an operating system to be executed by the BIOS of the information handling system 330, software to be pre-installed on the information handling system 330, the pre-installed temporary bootstrap eSIM profile, and any radio and antenna systems, among other features as detailed in the order 310. Along with the build, the manufacturer 325 may include the temporary bootstrap WWAN carrier information 315 and specific identification data for the managed client information handling system 330 on a memory device at the managed client information handling system 330. The device identification information for the managed client information handling system 330 may be provided by the manufacturer 325 as well to the IT manager at the onboarding administrator system 356 executing at the IT management server to identify the new or refurbished managed client information handling system 330 in an onboarding configuration profile stored there.

The identification data of the managed client information handling system 330 with a unique, device identification code or value, such as an encrypted DDID, may be provided to an IT management server 355 in an embodiment. The manufacturer 325, who may harvest the information of component serial numbers or other codes used in a unique device identification in some embodiments may provide a shipment verification profile to the onboarding administrator system 356 at the IT management server 355 with identification information data for later verification that the managed client information handling system 330 requesting to initiate onboarding provisioning from a temporary bootstrap WWAN carrier eSIM profile via an OOB connection is properly identified before the onboarding provisioning is initiated.

In the one embodiment, this identification information data of the managed client information handling system 330 may be the DDID described herein. Again, this DDID may be used by the managed client information handling system for access with the temporary bootstrap WWAN carrier SM-DS at 348 to a temporary restricted bootstrap WWAN wireless link. This temporary restricted bootstrap WWAN wireless link may be used to initiate onboarding provisioning at the onboarding administrator system 356 to include authorizing the managed client information handling system 330 to be provisioned with a regular access WWAN carrier eSIM profile from the same WWAN carrier 360 as the temporary bootstrap WWAN carrier or with different WWAN carrier 360 depending on the selection during onboarding provisioning. In this embodiment, the DDID is an encryption of hardware and/or software codes such as serial numbers associated with that hardware or software delivered on the managed client information handling system 330. These serial numbers associated with the hardware and/or software installed may be harvested by a device manufacturer in a particular selection or order encrypted and used as specific device identification. Such a specific device identification may be used and transmitted via the temporary and restricted bootstrap WWAN link for verification of this specific managed client information handling system 330 for onboarding provisioning by the enterprise onboarding administrator system 356. Because the serial numbers associated with the hardware and software within the managed client information handling system 330 are unique to that hardware and software and because these serial numbers are further encrypted, the possibility of determining a DDID is very low. This increases the security associated with onboarding provisioning initiation with the temporary provisional bootstrap WWAN carrier eSIM profile.

After physically building the manage client information handling system 330 according to the specifications laid out in the order 310, the manufacturer 325 may ship the information handling system 330 to an enterprise user. Once received, the enterprise user may unbox the managed client information handling system 330 and initiate a start-up process by activating, for example, a power button. Upon activation, the managed client information handling system 330 may initiate a startup-sequence that includes the embedded controller establishing a network interface device and executing code instructions of an endpoint onboarding agent 344. The endpoint onboarding agent 344 may the initiate an out-of-band (OOB) communication (e.g., the temporary and restricted bootstrap WWAN link communication) with the temporary bootstrap WWAN carrier SM-DS 348. In order to accomplish this, the EC may access and load certain drivers associated with a wireless interface device (e.g., wireless interface device 116, FIG. 1) and execute computer code used to establish this temporary and restricted bootstrap WWAN link with the temporary bootstrap WWAN carrier SM-DS 348 using the pre-installed temporary bootstrap eSIM profile and any type of WWAN antenna within the managed client information handling system 330 in an embodiment. In one embodiment, this occurs such that before a regular boot-up process proceeds and the BIOS and OS 335 boots up, an OOB communication is established via the EC establishing the temporary and restricted bootstrap WWAN link, via antenna controllers. In this embodiment, the temporary and restricted OOB communications are established outside of the OS boot up utilizing full application data communications by an OS. Such OOB communications may be established, such as in information handling systems, behind the scenes of an OS operation and function. For example, some such OOB communications may be established for reporting of machine health status, operations, or the like and may communicate some such data to an enterprise IT manager even when the OS has entered a low power mode. While booting up the OS 335 and, possibly, the BIOS, the OOB communication has already initiated the onboarding provisioning process at the IT management server 355 via the restricted temporary bootstrap WWAN link 345 to trigger provisioning and enablement to download a regular access carrier eSIM profile 350 from a selected regular access carrier 360 as selected by the onboarding administrator system 356 at the IT management server 355. In some other embodiments, a hardware processor such as the CPU or EC may execute the endpoint onboarding agent 344 to establish the OOB communication via the temporary and restricted bootstrap WWAN link 345 using the pre-installed temporary bootstrap eSIM profile 347 at a later state of boot up or after boot up. While this may delay, to some degree, initiation of the onboarding provisioning process at the IT management server 355, the enterprise user is still saved from having to perform one or more steps to provision a regular access WWAN carrier eSIM 350 as well as complete onboarding provisioning of software, firmware, and configuration downloads as described in embodiments herein.

The above automatic establishment of the temporary and restricted bootstrap WWAN link with the IT management server 355 by execution of code instructions of the endpoint onboarding agent 344 is used to initiate the onboarding provisioning process. This avoids having the enterprise user prompt the management information handling system to establish communication with the regular access WWAN carrier via a regular access SM-DS 348 themselves. Establishing a regular access WWAN link 346 to set up and enable provisioning of a regular access eSIM profile 350 may require an alternative wireless or wired access, a QR code, a second factor authentication, or other methods from the enterprise user. These other methods to provision and establish download of the regular access eSIM profile 350 would require several steps by an enterprise user or other person at the managed client information handling system 330. This delays onboarding provisioning of the new or refurbished device. Further, such additional steps performed at each of many managed client information handling systems deployed throughout an enterprise may become burdensome for an IT manager. The temporary provisional WWAN carrier eSIM profile preloaded with IMSI and other temporary credentials may automatically establish the temporary and restricted bootstrap WWAN link to automatically initiate the onboarding provisioning system via the onboarding administrator system 356 executing at the IT management server 355. This may increase the efficiency of downloading a provisioned regular access WWAN carrier eSIM profile 350, and initiating other onboarding provisioning steps for the managed client information handling system 330 by limiting the enterprise users' or IT manger's interactions with the regular access WWAN carrier 360 at the managed client information handling system 330 during an initial boot-up process. Establishing this temporary and restricted bootstrap WWAN OOB communication is done seamlessly, and the enterprise user may not be made aware of the communication to initiate the onboarding provisioning process.

According to embodiments herein, the IT manager may enter an onboarding configuration desired for the tasks that the managed client information handling system may conduct for the enterprise user into an onboarding configuration profile at the onboarding administrator system 356. The IT manager may utilize the IT management server system 355 executing code instructions of an onboarding administrator system 356 thereon to set various options as onboarding configuration settings. In addition to recording the hardware options selected for build of the managed client information handling system 330, such as types of processors, memory, or other hardware components with capabilities within the managed client information handling system 330 and the type of operating system, pre-loaded software and firmware included, and device identification information received from a manufacturer 325 may be recorded as well in the onboarding administrator system 356. Further, the IT manager may select with the onboarding administrator system 356 other types of designated software and firmware to be downloaded to the managed client information handling system 330 from the enterprise network upon delivery to onboard the managed client information handling system 330. Such software, firmware and other drivers designated for installation in the onboarding configuration profile will enable the managed client information handling system to perform designated tasks within the enterprise after onboarding. In another embodiment, the IT manager, via the onboarding administrator system 356, records and transmits the temporary provisional eSIM carrier profile information to an approved temporary bootstrap WWAN wireless carrier or carriers to subscribe in anticipation of using an approved temporary bootstrap WWAN network 360 for a temporary and restricted bootstrap WWAN link 345. As described, this temporary and restricted bootstrap WWAN link 345 is used for OOB communication access between the IT management server system 355 and the managed client information handling system 330 for initiation of onboarding provisioning. This restricted bootstrap WWAN wireless link 345 may be temporary for communications to initiate the automatic onboarding provisioning process and restricted in that communications are only with the remote IT management server 355 executing the onboarding administrator system. The restricted bootstrap WWAN wireless link 345 may be ended and the temporary provisional bootstrap eSIM disabled or deleted upon establishing a regular access WWAN wireless link 345 with the regular access WWAN carrier 360.

The IT manager may establish other onboarding configuration settings in the onboarding configuration profile at the onboarding administrator system 356 including designating one or more software applications for installation, designating drivers, updates and other software for installation, and designating any firmware for installation at the managed client information handling system 330. The IT manager may also establish further onboarding configuration settings via the onboarding administrator system 356 including policy settings with respect to operations, security settings, data and network access permissions or restrictions, and other operational configuration settings for the managed client information handling system 330. These options may be associated with the identifier information for the managed client information handling system 330 built or refurbished for an enterprise user at the onboarding administrator system 356 to enable later seamless and automatic onboarding provisioning according to embodiments herein.

The managed client information handling system 330 may include the temporary bootstrap eSIM profile credentials 347 at an eUICC in at least one memory according to an embodiment. Once the IT manager has selected a specific temporary bootstrap WWAN carrier or carriers, the IT manager uses the onboarding administrator system 356 to send the reciprocal carrier temporary bootstrap eSIM profile credentials to or request for a carrier temporary bootstrap eSIM profile credential directly from a server associated with the temporary bootstrap WWAN carrier. Because the manufacturer or IT manager has received the temporary bootstrap eSIM profile credentials 347 from the carriers or sent the reciprocal carrier profile to the temporary bootstrap WWAN carrier, the temporary and restricted bootstrap WWAN link 345 may be established through an SM-DS with an approved temporary bootstrap WWAN carrier 360. With this temporary and restricted bootstrap WWAN link 345, the device identification data and other onboarding provisioning initialization data may be transmitted by the endpoint onboarding agent 344 via execution by the embedded controller (EC) or other hardware processor to automatically initiate onboarding provisioning via the temporary and restricted bootstrap WWAN OOB link 345 to the remote IT management server system 355. With a ping and receipt of device identification data, location data, a request to start onboarding provisioning, and any other onboarding provisioning initialization data from the managed client information handling system 330, the onboarding administrator system 356 at the IT management server system 355 may trigger provisioning of a regular access eSIM profile 350 and eSIM credentials to the eUICC at the managed client information handling system 330 from a selected regular access WWAN carrier 360 with little to no interaction from the user.

In embodiments herein, as the enterprise user initiates power to the managed client information handling system 330 such that EC, CPU, or other hardware processing resource may commence execution of the endpoint onboarding agent 344 of the onboarding provisioning system, an OOB communication may be initiated so as to initiate onboarding provisioning at the IT management server. With the temporary and restricted WWAN link access from the endpoint onboarding agent 344 to the IT management server, a request to initiate onboarding provisioning and onboarding provisioning initiation data maybe transmitted to the onboarding administrator system 356 to trigger provisioning and enablement of a regular access eSIM profile 350 and eSIM credentials from selection of a regular access WWAN carrier 360 from among a plurality of available regular access WWAN carriers 360 as discussed. The regular access WWAN carrier 360 may establish a regular access WWAN link to the managed client information handling system 330 to transmit and download the regular access eSIM profile 350. This regular access WWAN link will also be used to complete the onboarding provisioning if enterprise user authentication is successful.

Upon being operatively coupled to the subscription manager-discovery server (SM-DS) for the regular access WWAN wireless link 346, the endpoint onboarding agent 344 may direct a request for additional onboarding provisioning steps to be transmitted to the onboarding administrator system 356 via the regular access WWAN wireless link. The onboarding administrator system 356 responds with onboarding configuration settings such as a list of designated software applications to be downloaded and installed, and other lists such as firmware, drivers or other code or settings to be downloaded and installed or to be implemented after authentication of the enterprise user on the enterprise network. In a further embodiment, the onboarding administrator system may transmit a location, such as a secure URL, for an enterprise identity provider service server 387 as well as an instruction to provide login credentials or other network credentials to access the enterprise network and the IT management server 355 for continued onboarding provisioning.

In some embodiments, for access to the enterprise network and further onboarding provisioning process steps the enterprise user may be directed to provide enterprise network log in credentials or some other authenticating credentials by accessing an enterprise identity provider service server 387. Further onboarding provisioning steps may include downloading designated software applications, firmware, and implementing operational configuration settings to enable normal operation and ongoing regular access wireless connectivity of the delivered managed client information handling system in various embodiments.

As part of the onboarding configuration settings received from the IT management server system after initiation of onboarding provisioning, the managed information handling system 330 may receive location address URL or other location indicator for a remote enterprise identity provider server 387 and an instruction requiring enterprise login passwords or other network credentials be submitted in order to continue access to the regular access WWAN carrier SM-DS 348 for further onboarding downloads and configuration settings. These login or other network credentials may also be required to continue usage and online connectivity of the newly-delivered managed client information handling system 330 in some embodiments. In an embodiment where the login credentials or other enterprise network credentials are authenticated by the enterprise identity provider via server 387, the enterprise identity provider server 387 may notify the onboarding administrator system 356 at the IT management server 355. With this notification of successful enterprise user authentication to the onboarding administrator system 356, the remaining onboarding provisioning process may be completed. As described, this additional onboarding provisioning may include downloading for installation designated software, firmware, and implementation of operational configurations such as policies and hardware or software settings at the managed client information handling system 330. Further, the enterprise user may be promoted to allow for ongoing wireless connectivity at the managed client information handling system 330 via the selected regular access WWAN carrier for ongoing operations and monitoring within the enterprise.

Again, this onboarding provisioning process may be completed with little to no interaction from the enterprise user such that it may appear to the enterprise user to be a seamless boot-up of the managed client information handling system 330. Additionally, because the endpoint onboarding agent 344 via execution by the EC or CPU controls the operation of the temporary and restricted bootstrap WWAN link OOB communication, the downloading of the regular access WWAN carrier eSIM profile 350 is triggered via the onboarding administrator system 356 executing at the remote IT management server 355. Since this process may be, in some embodiments, OS-independent such that initializing the onboarding provisioning process for downloading and provisioning the regular access WWAN carrier eSIM profile 350 occurs without operation of the OS 335 in some embodiments. In other embodiments, the endpoint onboarding agent 344 may be executed by the OS 335, but require limited steps performed by the enterprise user. Thus, the onboarding provisioning process executed via the endpoint onboarding agent 344 with the pre-installed temporary bootstrap eSIM profile 347 and administered by the onboarding administrator system 356 at the remote IT management server 355 is unlike other eSIM initialization processes. For example, the systems 300 and method described herein do not require a carrier quick response (QR) code to be used nor does it require access via a different wireless protocol secure channel by an enterprise user from a second information handling system device of the enterprise user to manually download the regular access WWAN carrier eSIM profile 350. In this way, the onboarding process with the endpoint onboarding agent 344 and the pre-installed temporary bootstrap eSIM profile 347 may seamlessly trigger onboarding provisioning including establishing a regular access WWAN eSIM profile 350 without several required steps be performed at the managed client information handling system 330 by an enterprise user.

Figure 4:
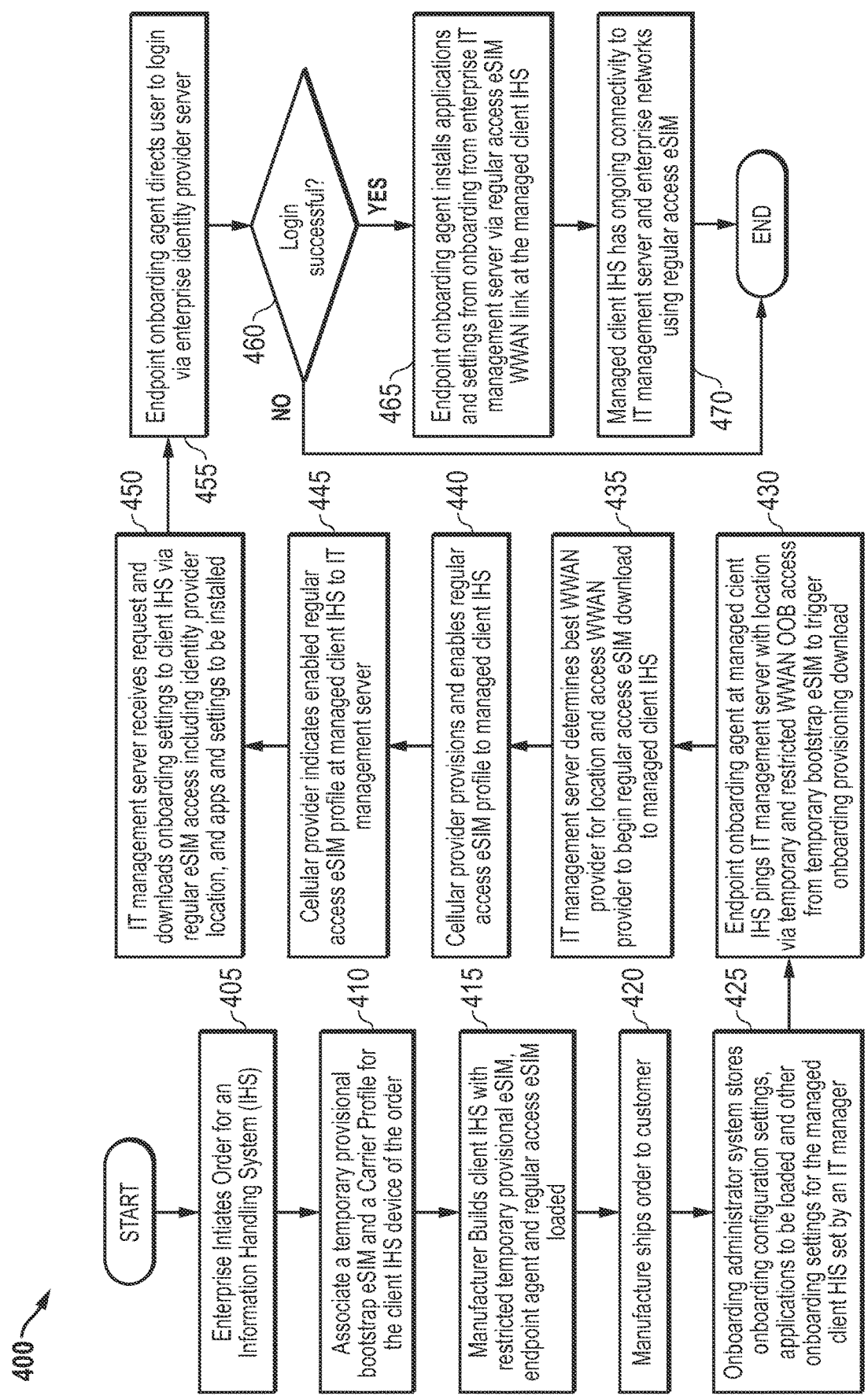
FIG. 4 is a flow diagram of describing a method of onboarding provisioning a managed client information handling system via a temporary bootstrapped restricted WWAN access with a temporary bootstrap eSIM profile according to an embodiment of the present disclosure.

FIG. 4 is a flow diagram of describing a method 400 of onboarding provisioning for a managed client information handling system within an enterprise according to an embodiment of the present disclosure. The method 400 may begin at block 405 with a customer (e.g., enterprise owner of a managed client information handling system) initiating a build-to-ship (BTS) order for an information handling system. As described herein, the BTS process may include an IT manager selecting any specific hardware, firmware, and software to be included with the managed client information handling system to satisfy the role the managed client information handling system will be used for by the enterprise user within the enterprise.

Proceeding to block 410, the IT manager may assign a temporary provisional bootstrap eSIM profile to the managed client information handling system being built or refurbished. In an embodiment, the IT manager may determine that the touchless onboarding provisioning of the managed client information handling system being built or refurbished will be used, the IT manager may determine to have pre-loaded instructions of the onboarding provisioning system, an endpoint onboarding agent, temporary bootstrap eSIM credentials for temporary and restricted bootstrap WWAN access with an approved temporary bootstrap WWAN carrier. Further, the IT management system may provide reciprocal carrier profile data for the temporary bootstrap eSIM credentials pre-loaded on the managed client information handling system to an approved temporary bootstrap WWAN carrier for use at a temporary bootstrap WWAN SM-DS to grant restricted access via a WWAN OOB wireless link. The temporary bootstrap eSIM credentials are associated with identification data, for example a DDID, for the manufactured or refurbished managed client information handling system in the onboarding administrator system at the IT management server.

At block 415, the manufacturer builds or refurbishes the managed client information handling system according to the specification of the enterprise and pre-loads instructions of the onboarding provisioning system, an endpoint onboarding agent, as well as preloading temporary bootstrap eSIM credentials for temporary and restricted bootstrap WWAN access with an approved temporary bootstrap WWAN carrier as described in embodiments herein. As described herein, the manufacturer may build the managed client information handling system based on an order form created by the IT manager during the BTS process in an example embodiment. Again, the manufacturer may build the information handling system to include those hardware, firmware, and software features, including the pre-loaded instructions of the onboarding provisioning system as, requested by the enterprise IT manager. The hardware components and firmware or software components included in the build may have codes or serial numbers harvested by the manufacturer and used to create a unique, encrypted device identification unique to the managed client information handling system in some embodiments. Such a unique device identification data may then be associated with custom set of onboarding configuration settings for onboarding provisioning at the IT management server systems. Further, the unique device identification data may be associated with a temporary stored provisional bootstrap eSIM profile for temporary and restricted access to the IT management system via an approved temporary bootstrap WWAN carrier and included in a carrier verification request profile sent to the temporary bootstrap WWAN carrier as described below.

In one example embodiment, the unique device identification is an encryption of hardware and/or software codes such as serial numbers associated with that hardware or software. In this embodiment, these serial numbers associated with the hardware and/or software of the information handling system may be encrypted and used as specific device identification being transmitted to the temporary bootstrap WWAN carrier SM-DS or to the IT management server system for later verification and automatic initiation of the onboarding provisioning process according to embodiments herein. In the present specification, this device identification may be referred to as a Dell® Device ID (DDID). This DDID may be used by the information handling system and, later, the SM-DS as part of a system to authorize the information handling system to trigger access and download regular access WWAN carrier eSIM profiles and one or more international mobile subscriber identities (IMSIs) and other carrier eSIM profile data to the managed client information handling system. Because the serial numbers associated with the hardware and software within the information handling system are unique to that hardware and software, because the selection of components used and the order used to form the DDID, and because these serial numbers are further encrypted, the possibility of determining and spoofing a DDID is very low. This increases the security associated with onboarding provisioning via the restricted and temporary bootstrap WWAN carrier eSIM profile from the managed client information handling system At block 420, the manufacturer or refurbisher ships the managed client information handling system to an enterprise user with the pre-loaded instructions of the onboarding provisioning system, an endpoint onboarding agent, temporary bootstrap eSIM credentials for temporary and restricted bootstrap WWAN access with an approved temporary bootstrap WWAN carrier. Further, the IT manager or IT management server system may receive the identifying data for the shipped managed client information handling system for later secure identification.

At block 425, an IT manager will also determine the onboarding configuration settings for the onboarding provisioning process of embodiments herein for the managed client information handling system and store those with the onboarding administrator system at the IT management server system for an onboarding profile for the managed client information handling system. The onboarding configuration settings include software applications to be downloaded or cloud linked to the managed information handling system to perform its function within the enterprise. For example, the IT manager may determine that software applications such as Zoom®, Slack®, MS Office®, and antivirus software and security software must be installed on the managed client information handling system. Other onboarding configuration settings may include determining any firmware or drivers for hardware or operations of the managed client information handling system operations. Additional onboarding configuration settings may include operation configurations and policy settings for the new or refurbished managed, client information handling system in an embodiment. For example, operation configurations and policy settings may include establishing corporate policies over computer software permissions, security policies relating to access permissions or restrictions to enterprise databases or resources, policies on system updates and others in various embodiments. The IT manager may set this onboarding profile at the onboarding administrator system so that these onboarding configuration settings are conducted or provisioned as well as a determination of individual regular access WWAN eSIM profiles. These onboarding configuration settings must be executed or provisioned and downloaded before a managed client information handling system may be used. To conduct this provisioning and enabling WWAN access and the other onboarding provisioning tasks for each newly deployed managed client information handling system would be prohibitive and time consuming. Current manual setup takes many steps and generates friction delaying a deployed managed client information handling system from being up and running.

At block 430, the delivered managed client information handling system may be turned on by the enterprise user out of the box in an embodiment. Upon startup, the EC may execute, before full boot up in some embodiments, or the CPU, EC, or other hardware processor may execute after boot up the code instructions of the endpoint onboarding agent pre-loaded on the managed client information handling system in various embodiments. In a particular embodiment, the execution of the endpoint onboarding agent is automatic upon first powering on the managed client information handling system. The endpoint onboarding agent executing with the EC, CPU, or other hardware processor initiates the wireless network interface in an embodiment and prepares to initiate the onboarding provisioning process as in embodiments herein. The endpoint onboarding agent may use the pre-loaded temporary bootstrap eSIM credentials for temporary and restricted bootstrap WWAN access with an approved temporary bootstrap WWAN carrier SM-DS. This establishes a temporary and restricted bootstrap WWAN link to provide strictly limited access to the remote IT management server system executing the onboarding administrator system administering the onboarding provisioning process in an embodiment.

The endpoint onboarding agent pings the IT management server with device identification data for the managed client information handling system in an embodiment. In some embodiments, the endpoint onboarding agent pings the IT management server with device location data for the physical location of the managed client information handling system. Upon receipt of the notification of power up, the device identification data, and, in some embodiments, the device location data for the managed client information handling system, the onboarding administrator system at the IT management server administering the onboarding provisioning will trigger initiation of the onboarding provisioning. In an embodiment, the onboarding administrator system will execute code instructions to determine a WWAN carrier optimal for the managed client information handling system based on signal quality or base station proximity or other factors at the location of the managed client information handling system. Additionally, the onboarding administrator system will execute and transmit instructions for provisioning and enabling a regular access eSIM profile and credentials for regular WWAN access to the managed client information handling system, and for conducting software downloads and other onboarding configuration tasks according to embodiments herein.

At block 435, the onboarding administrator system executing at the IT management server may determine, from received location data for the managed client information handling system, which from among a plurality of available WWAN carriers used by the enterprise has a base station within range and with sufficient quality of service signal capabilities for the location. In other embodiments, the onboarding administrator system at the IT management server administering the onboarding provisioning process of embodiments herein may select an optimal base station for a regular access WWAN carrier with a best quality of service signal for the location of the managed client information handling system. It is contemplated that the WWAN carrier selected for regular access WWAN wireless linking with the manage client information handling system by the IT management server may sometimes be the same WWAN carrier that serves as the temporary bootstrap WWAN carrier for the temporary and restricted bootstrap WWAN OOB communications. The temporary bootstrap WWAN carrier used by the endpoint onboarding agent to ping the onboarding administrator system at the IT management server and initiate the onboarding provisioning may also serve as the regular access WWAN carrier in some embodiments. In other embodiments, a different WWAN carrier may be selected for the regular access WWAN link to the complete onboarding provisioning and to manage client information handling system.

Upon selecting a regular access WWAN carrier for the managed client information handling system, the onboarding administrator system executing at the IT management system may send a command to the WWAN carrier under a subscription contract with the enterprise to issue a regular access eSIM profile at block 440. The WWAN carrier may provision and enable a regular access eSIM profile for the managed client information handling system being onboarded. A regular access WWAN wireless link is established between the selected regular access WWAN carrier base station and the managed client information handling system by the selected WWAN SM-DS. With this regular access WWAN wireless link, a regular access eSIM profile is downloaded to the eUICC memory at the managed client information handling system. Then the provisioned regular access eSIM profile for the managed client information handling system is enabled with the WWAN carrier.

At block 445, the WWAN carrier notifies the IT management server that the managed and client information handling system is successfully provisioned with the regular access eSIM profile. In this way, the onboarding administrator system at the IT management server system administering the onboarding provisioning may prepare to receive a request for additional onboarding steps.

Proceeding to block 450, the onboarding administrator system at the IT management server receives a request via the regular access WWAN link from the managed client information handling system for next steps of the onboarding provisioning process in an embodiment. In another embodiment, receipt of an indication of successful provisioning of the regular access eSIM profile may trigger transmission of onboarding provisioning next steps from the onboarding administrator system at the IT management server to the managed client information handling system. The onboarding administrator system generates a response for the onboarding provisioning next steps by transmit onboarding configuration setting information about the prospective remaining onboarding process to the managed client information handling system. In an embodiment, the IT management server may transmit to the managed client information handling system the location of an identity provider sever system, such as with a secure URL, for login authentication of an enterprise user to access the enterprise network and the IT management system further for additional onboarding. Further, in some embodiments, the transmitted onboarding configuration setting information includes a list of designated software applications and firmware that needs to be downloaded as well as operational configurations to be adjusted.

At block 455, the endpoint onboarding agent may direct an enterprise user at the managed client information handling system to access the identity provider server system and provide enterprise user login credentials or other secure access credentials for authentication of the enterprise user. In this way, enterprise networks, data, and other resources may be protected from unauthorized access. This includes unauthorized downloads of designated software or firmware for onboarding from the enterprise network.

At block 460, the enterprise user login credentials or other secure access credentials are validated by the enterprise identity provider service server. If not successfully authenticated at block 460, the method may end, and a notification of the unsuccessful onboarding may be provided to the IT manager via the onboarding administrator system at the IT management server system. If the login or other secure credentials of the enterprise user are successfully authenticated at block 460, the method may proceed to block 465.

At block 465, the IT management server may to continue the onboarding provisioning process for the managed client information handling system by downloading software, firmware and transmitting commands to establish operational configurations and policy settings at the managed client information handling system. The IT manager at the IT management server system had previously used the onboarding administrator system to determine several onboarding configuration settings at block 425 for the managed client information handling system. At block 465 and upon authentication of the enterprise user at the managed client information handling system, the onboarding administrator system at the IT management system may download one or more designated software applications via the regular access WWAN link established with the managed client information handling system. Further, the onboarding administrator system at the IT management system may further download any firmware, drivers, updates or the like pursuant to the onboarding configuration settings and ongoing management of client information handling systems. Additionally, the onboarding administrator system at the IT management system may transmit instructions for setting operational configuration settings and enterprise policies for operation of this managed client information handling system at block 465.

At block 470, the provision regular access eSIM profile at the managed client information handling system may then be used going forward to provide ongoing WWAN link wireless connectivity for the managed client information handling system. This may provide for an always-connected or always connectable wireless availability for the IT management system to manage, monitor, update or otherwise access the deployed and onboarded managed client information handling system. At this point, the method of onboarding provisioning process of the present embodiments may end. According to the foregoing embodiments, the IT manager may provide for a near seamless out-of-box automatic provisioning of WWAN wireless connectivity and onboarding of a new or refurbished client information handling systems throughout an enterprise with limited steps required at the delivered device or by the enterprise user.

The blocks of the flow diagrams of FIG. 4 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A method of onboarding provisioning of a managed client information handling system, comprising:

with a hardware processor, executing code instructions of an endpoint onboarding agent to detecting a powering up process at the managed client information handling system and automatically establish, via the wireless interface device, a first restricted bootstrap WWAN wireless link with a WWAN carrier using a stored temporary provisional bootstrap embedded subscriber identity module (eSIM);

identifying the managed client information handling system via the first restricted bootstrap WWAN wireless link to a remote information technology (IT) management server of an enterprise to trigger a second regular access WWAN wireless link for the managed client information handling system;

receiving an enablement instruction and provisioning for a regular access eSIM profile to access the second regular access WWAN wireless link from the WWAN carrier at an embedded universal integrated circuit card;

receiving, via the second regular access WWAN wireless link, onboarding configuration settings for the managed client information handling system including identification of designated software applications for enterprise IT management controls for security on use of the managed client information handling system to access restricted enterprise files and designated software applications for execution to conduct user communications, for execution of user productivity software applications, and anti-virus or security software to protect access to enterprise network resources pursuant to an enterprise IT policy from the remote IT management server for onboarding installation of the managed information handling system for use within the enterprise;

verifying login credentials at the enterprise identity provider;

upon verified login credentials at the enterprise identity provider, downloading the designated software applications pursuant to the enterprise IT policy from the remote IT management server on the managed client information handling system during onboarding installation of the managed information handling system for use within the enterprise; and installing the designated software applications including identification of designated software applications for enterprise IT management controls for security on use of the managed client information handling system to access restricted enterprise files and designated software applications for execution to conduct user communications, for execution of user productivity software applications, and anti-virus or security software to protect access to enterprise network resources for onboarding installation of the managed information handling system for use within the enterprise to perform designated tasks.

2. The method of claim 1, wherein establishing the first restricted bootstrap WWAN wireless link includes connecting to the WWAN carrier using the temporary provisional bootstrap eSIM and an identifier of the managed client information handling system.

3. The method of claim 1, wherein the first restricted bootstrap WWAN wireless link is limited by the endpoint onboarding agent and the WWAN carrier to only communicate to the remote IT management server onboarding initialization data including managed client information handling system identifier data and location data for the managed client information handling system.

4. The method of claim 1, further comprising:
communicating via the first restricted bootstrap WWAN wireless link to the remote IT management server onboarding initialization data including a client information handling system identifier data and location data to trigger selection of the second regular access WWAN wireless link with a second WWAN carrier selected from a plurality of WWAN carriers for a location of the managed client information handling system identified by the location data.

5. The method of claim 1, further comprising:
when the first restricted bootstrap WWAN wireless link successfully communicates to the remote IT management server onboarding initialization data including a managed client information handling system identifier data and location data for the managed client information handling system, terminating the temporary first restricted bootstrap WWAN wireless link.

6. The method of claim 1, further comprising:
when the first restricted bootstrap WWAN wireless link successfully communicates to the remote IT management server onboarding initialization data including a managed client information handling system identifier data and location data, disabling the temporary provisional bootstrap eSIM for any further communications with the first restricted bootstrap WWAN wireless link.

7. The method of claim 1, further comprising:
upon verified login credentials at the enterprise identity provider, downloading plural client configuration settings for the managed client information handling system as additional onboarding measures.

8. A managed client information handling system operating an onboarding provisioning system comprising:
a hardware processor, an embedded controller (EC), a memory, and a wireless interface device;
an electronic subscriber identity module (eSIM) memory storing a temporary provisional bootstrap eSIM installed with a generic initial bootstrap profile to access a restricted bootstrap wireless wide area network (WWAN) link to a remote information technology (IT) management server of an enterprise for managing the managed client information handling system;
the hardware processor executing code instructions of an endpoint onboarding agent to automatically establish, via the wireless interface device, the restricted bootstrap WWAN wireless link with a WWAN carrier using the temporary provisional bootstrap eSIM upon start-up of the managed client information handling system, where the restricted bootstrap WWAN wireless link transmits identifier data for the managed client information handling system to trigger a regular access WWAN wireless link for the managed client information handling system;
an eSIM provisioning system including an embedded universal integrated circuit card (eUICC) to receive, via the wireless interface device, enablement instruction for a regular access eSIM profile to access a regular access WWAN wireless link from the WWAN carrier;
the hardware processor to receive onboarding configuration settings for the managed client information handling system including designated software applications for enterprise IT management controls for security on use of the managed client information handling system to access restricted enterprise files and designated software applications for execution to conduct user communications, for execution of user productivity software applications, and anti-virus or security software to protect access to enterprise network resources pursuant to an enterprise IT policy from the remote IT management server for onboarding installation at the managed client information handling system for use in the enterprise;
the endpoint agent to access the enterprise identity provider; and
upon verified login credentials at the enterprise identity provider, the wireless interface device to receive the designated software applications on the managed client information handling system including identification of designated software applications for enterprise IT management controls for security on use of the managed client information handling system to access restricted enterprise files and designated software applications for execution to conduct user communications, for execution of user productivity software applications, and anti-virus or security software to protect access to enterprise network resources for onboarding installation to implement controls on use of the managed client information handling system with and access to enterprise network resources pursuant to an enterprise IT policy.

9. The managed client information handling system of claim 8, wherein establishing the first restricted bootstrap WWAN wireless link includes connecting to the WWAN carrier using the temporary provisional bootstrap eSIM to communicate onboarding initialization data including the identifier data and location data for the managed client information handling system.

10. The managed client information handling system of claim 8, wherein the first restricted bootstrap WWAN wireless link is restricted by the endpoint onboarding agent and the WWAN carrier to communicate with the remote IT management server to communicate onboarding initialization data.

11. The managed client information handling system of claim 8, further comprising:
the wireless interface device communicating via the first restricted bootstrap WWAN wireless link to the remote IT management server location data to trigger selection of the second regular access WWAN wireless link with a second WWAN carrier selected from a plurality of WWAN carriers for a location of the managed client information handling system identified by the location data.

12. The managed client information handling system of claim 8, further comprising:
when the first restricted bootstrap WWAN wireless link successfully communicates to the remote IT management server onboarding initialization data including managed client information handling system identifier data and location data for the managed client information handling system, the endpoint onboarding agent terminates the temporary first restricted bootstrap WWAN wireless link.

13. The managed client information handling system of claim 8, further comprising:
when the first restricted bootstrap WWAN wireless link successfully communicates to the remote IT management server onboarding initialization data including managed client information handling system identifier data and location data for the managed client information handling system, the endpoint onboarding agent disables the temporary provisional bootstrap eSIM for any further communications with the first restricted bootstrap WWAN wireless link.

14. The managed client information handling system of claim 8, wherein the onboarding configuration settings for the client information handling system including the address of the enterprise identity provider to be used to log in and the designated software applications for onboarding installation to the managed client information handling system are established for the managed client information handling system prior to delivery of the managed client information handling system to a user at the remote IT management server.

15. The information handling system of claim 8, further comprising:
upon verified login credentials at the enterprise identity provider, downloading plural client configuration settings for the managed client information handling system as additional onboarding measures.

16. An information technology (IT) management information handling system operating an onboarding provisioning management system comprising:
a hardware processor, a memory, and a network interface device;
the processor receiving, via the network interface device, identification and physical location of a new, managed client information handling system on a restricted bootstrap wireless wide area network (WWAN) wireless link at a WWAN carrier established with credentials from a first temporary provisional bootstrap embedded subscriber identity module (eSIM) at the new, managed client information handling system;
the hardware processor determining an optimal, second regular access WWAN wireless link based on a physical location of the new, managed client information handling system;
the hardware processor triggering the optimal, second regular access WWAN wireless link to send an enablement instruction and provisioning for a regular access eSIM profile to the new, managed client information handling system;
the network interface device transmitting onboarding configuration settings to the new, managed client information handling system including identification of designated software applications for onboarding installation on the new, managed client information handling system for use with an enterprise managing the new, managed client information handling system; and
upon verified login credentials at the enterprise identity provider, the wireless interface device to transmit the designated software applications including identification of designated software applications access to enterprise network resources for enterprise IT management controls for security on use of the new, managed client information handling system to access restricted enterprise files and designated software applications for execution to conduct user communications, for execution of user productivity software applications, and anti-virus or security software to protect access to enterprise network resources of the network pursuant to an enterprise IT policy from the IT management information handling system server for the enterprise to the new, managed client information handling system during onboarding installation on the new, managed client information handling system for use with the enterprise.

17. The IT information handling system of claim 16, wherein establishing the first restricted bootstrap WWAN wireless link includes connecting via the WWAN carrier using the temporary provisional bootstrap eSIM to receive onboarding initialization data from the new, managed client information handling system including identifier data for the identification and location data for the physical location of the new, managed client information handling system.

18. The IT information handling system of claim 16, wherein the first restricted bootstrap WWAN wireless link is restricted via the WWAN carrier to communicate with the remote IT management server to communicate onboarding initialization data.

19. The IT information handling system of claim 16, further comprising:
the hardware processor triggering the optimal, second regular access WWAN wireless link to send an enablement instruction and provisioning for a regular access eSIM profile to the new, managed client information handling system on a second WWAN carrier selected from a plurality of WWAN carriers for the physical location of the new, managed client information handling system identified by the location data.

20. The IT information handling system of claim 16, further comprising:
when the first restricted bootstrap WWAN wireless link successfully receives the onboarding initialization data including the identifier data and location data for the managed client information handling system, the network interface device terminates the temporary first restricted bootstrap WWAN wireless link.

* * * * *